United States Patent Office.

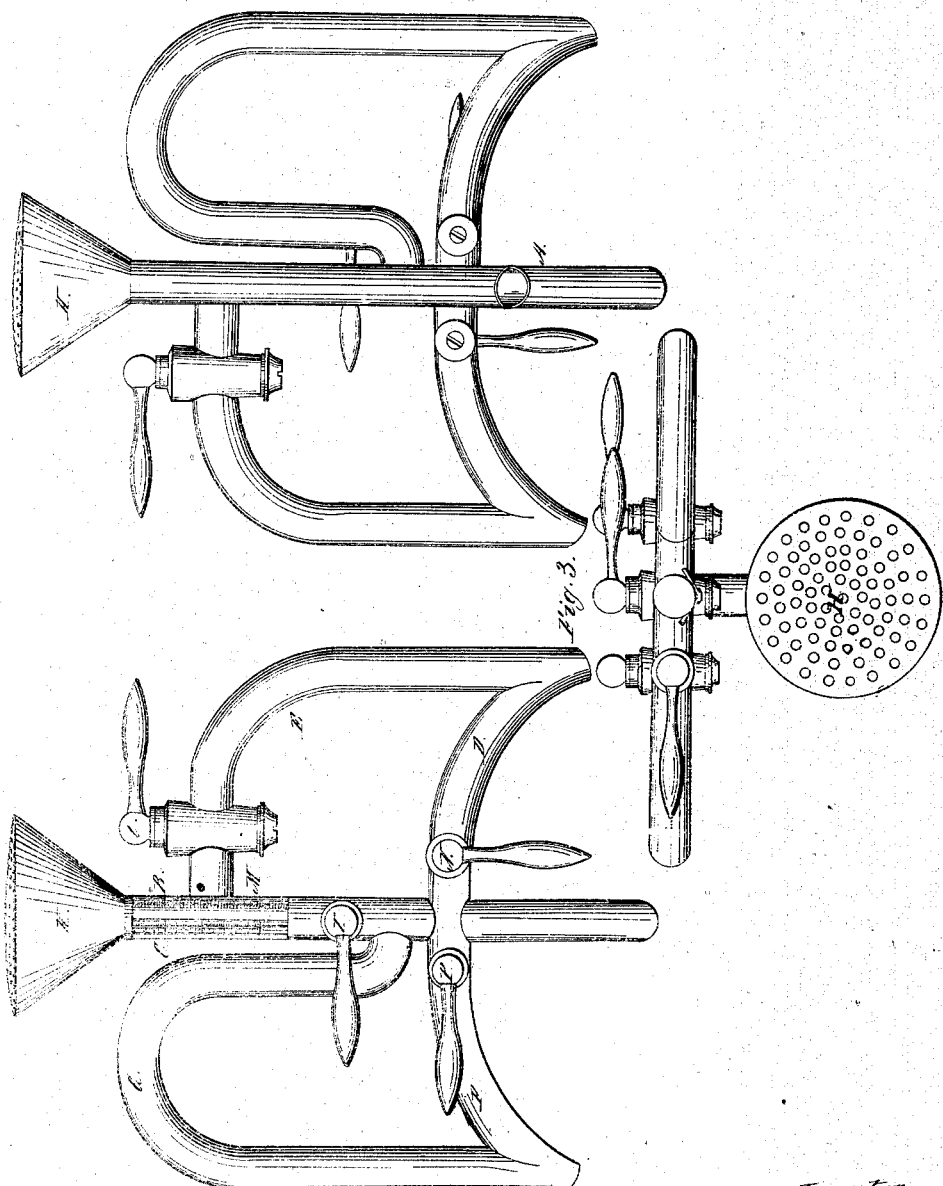

IMPROVED APPARATUS TO BE ATTACHED TO STILLS TO PREVENT FRAUD.

W. J. WALKER, OF BALTIMORE, MARYLAND.

Letters Patent No. 60,294, dated December 4, 1866.

SPECIFICATION.

TO ALL WHOM IT MAY CONCERN:

Be it known that I, WM. J. WALKER, of the city of Baltimore, in the county of Baltimore, in the State of Maryland, have invented a new and improved mode of testing the proof of high and low wines, or other fermented liquors, and of conducting them or either of them to their tanks or respective tanks; and I do hereby declare that the following is a full and exact description thereof, reference being had to the accompanying drawings and to the letters of reference marked thereon, in which—

Figure 1 represents the front view.
Figure 2, the back view.
Figure 3, the top view.
Letter A, the worm of the still extended and turned up, with the top closed.
Letter B, the hydrometer, to test the proof.
Letter C, the thermometer, to test the temperature.
Letter D, a high wine pipe, connected with the worm, and conveying the high wine to its tank while testing the proof.
Letter E, a high wine pipe, connected with the worm, and also with the high wine pipe D, to carry off the high wine ordinarily.
Letter F, the low wine pipe, connected with the worm, and conveying the low wine to its tank or cistern.
Letter G, the waste pipe, either above or below the stop-cock I, to carry off the wines to prevent disaster in case of neglect to turn the necessary stop-cocks.
Letter H, the escape pipe, to carry off air and gas.
Letter I, stop-cock in worm, to shut off liquor while testing proof.

The operations of the apparatus is, the wine passes through worm of the still, and by shutting stop-cock I, the wine is tested in M by hydrometer B and thermometer C as to proof and temperature. If high wine, it passes through tube D, by turning stop-cock N while testing; after testing, it can pass through pipe E ordinarily, by turning stop-cock O, and stopping stop-cock N. Then, when the hydrometer indicates low wine, tested in same way, shut stop-cock O, and open P, in pipe F, and it passes into low wine tank. Then if all stop-cocks are shut by accident, the wine passes off, through pipe G, into low wine pipe F and tank, without injury. Then if gas and air accumulate, they pass through pipe H, which is higher than all the rest, and hence cannot overflow.

What I claim, and desire to secure by Letters Patent of the United States, is—

1. The combination of a vessel or tube containing a hydrometer, or a hydrometer and thermometer, with a system of pipes and stop-cocks, so as to test spirits, and pass it to its proper tank, substantially as described.
2. The waste pipe for safety, and escape of gas and air, in combination with a testing apparatus, as described.
3. The combination of stop-cocks and pipes for testing and distributing the spirits, as described.

W. J. WALKER.

Witnesses:
JOHN S. HOLLINGSHEAD,
WM. J. FAHERTY.